(12) United States Patent
Stevens et al.

(10) Patent No.: US 11,398,657 B2
(45) Date of Patent: Jul. 26, 2022

(54) METHOD FOR MANAGING THE ELECTRIC POWER PASSING THROUGH A METAL-AIR BATTERY CELL AND ASSOCIATED CELL

(71) Applicant: ELECTRICITE DE FRANCE, Paris (FR)

(72) Inventors: Philippe Stevens, Noisy Rudignon (FR); Gwenaelle Toussaint, Nemours (FR)

(73) Assignee: ELECTRICITE DE FRANCE, Paris (FR)

(*) Notice: Subject to any disclaimer, the term of this patent is extended or adjusted under 35 U.S.C. 154(b) by 183 days.

(21) Appl. No.: 16/629,761

(22) PCT Filed: Jul. 10, 2018

(86) PCT No.: PCT/EP2018/068627
§ 371 (c)(1),
(2) Date: Jan. 9, 2020

(87) PCT Pub. No.: WO2019/011899
PCT Pub. Date: Jan. 17, 2019

(65) Prior Publication Data
US 2020/0220241 A1    Jul. 9, 2020

(30) Foreign Application Priority Data
Jul. 10, 2017 (FR) .................................... 17 56511

(51) Int. Cl.
*H01M 12/08* (2006.01)
*H01M 4/24* (2006.01)
(Continued)

(52) U.S. Cl.
CPC ............. *H01M 12/08* (2013.01); *H01M 4/24* (2013.01); *H01M 10/44* (2013.01); *H01M 16/00* (2013.01); *H01M 2300/0014* (2013.01)

(58) Field of Classification Search
CPC ........ H01M 12/08; H01M 4/24; H01M 10/44; H01M 16/00; H01M 2300/0014
See application file for complete search history.

(56) References Cited

U.S. PATENT DOCUMENTS

2011/0250512 A1    10/2011   Friesen et al.

FOREIGN PATENT DOCUMENTS

| FR | 2 975 534 A1 | 11/2012 |
| WO | 2013/110097 A1 | 8/2013 |
| WO | 2014083267 A1 | 6/2014 |

OTHER PUBLICATIONS

Neburchilov et al., "A review on air cathodes for zinc-air fuel cells," Journal of Power Sources, 2010, vol. 195, pp. 1271-1291.

*Primary Examiner* — Sarah A. Slifka
(74) *Attorney, Agent, or Firm* — Faegre Drinker Biddle & Reath LLP

(57) ABSTRACT

A method for managing the electric power passing through a cell of a metal-air battery and the associated cell. The cell comprises a negative electrode connected to a positive terminal of the battery, two positive electrodes, and a switching means. The switching means is maintained in a configuration connecting the positive terminal to the first positive electrode when an electric power to pass through the battery corresponds to a first power range, and in a configuration connecting the positive terminal to the second positive electrode when an electric power to pass through the battery corresponds to a second power range, the second power range being associated with higher electric powers than the electric powers of the first range.

15 Claims, 6 Drawing Sheets

(51) Int. Cl.
*H01M 10/44* (2006.01)
*H01M 16/00* (2006.01)

METHOD FOR MANAGING THE ELECTRIC POWER PASSING THROUGH A METAL-AIR BATTERY CELL AND ASSOCIATED CELL

CROSS-REFERENCE TO RELATED APPLICATIONS

This application is the U.S. national phase of the International Patent Application No. PCT/EP2018/068627 filed Jul. 10, 2018, which claims the benefit of French Application No. 17 56511 filed Jul. 10, 2017, the entire content of which is incorporated herein by reference.

TECHNICAL FIELD

The invention relates to the field of metal-air batteries, and more particularly to the methods for managing the electric power passing through these batteries during the charging and discharging phases. The invention relates equally well to a single metal-air cell or to a set of cells forming a battery.

BACKGROUND

Metal-air battery cells generally consist of a negative electrode based on a metal such as zinc, iron, or lithium, coupled to an air electrode. These two electrodes are generally in contact with an aqueous alkaline electrolyte.

During the discharging of such a battery, oxygen is reduced at the positive electrode and the metal is oxidized at the negative electrode:

Discharging at the negative electrode: M→M$^{n+}$+ne$^-$

Discharging at the positive electrode: O$_2$+2H$_2$O+4e$^-$ →4OH$^-$

The advantage of metal-air systems lies in the use of a positive electrode of infinite capacity, as the oxygen consumed at the positive electrode does not need to be stored in the electrode but can be taken from the ambient air. Metal-air type electrochemical generators are known for their high specific energies, which can reach several hundred W-h/kg.

Air electrodes are used for example in alkaline fuel cells, which are particularly advantageous compared to other systems because of the high reaction kinetics at the electrodes and because of the absence of noble metals such as platinum.

An air electrode is a porous solid structure, usually of carbon powder, in contact with the liquid electrolyte. The interface between the air electrode and the liquid electrolyte is a so-called "triple-contact" interface where the active solid material of the electrode (this electrode generally further comprising a catalyst), the gaseous oxidant, meaning air, and the liquid electrolyte are present simultaneously. The air electrode is usually composed of carbon powder with its high surface area, providing a large reaction surface area and therefore a high current density relative to the geometric surface area of the electrode. A large reaction surface area is advantageous in compensating for the difference between the density of gaseous oxygen and that of a liquid. For example, the molar density of oxygen in air is about 0.03 mol/L compared to water which has a density of 55 mol/L. The large surface area of the carbon makes it possible to multiply the reaction sites in the air electrode.

A description of the different types of air electrodes for zinc-air batteries is described for example in the bibliographical article by V. Neburchilov et al., entitled "A review on air cathodes for zinc-air fuel cells," *Journal of Power Sources* 195 (2010) p. 1271-1291.

When a metal-air battery needs to be recharged electrically, the direction of the current is reversed. Oxygen is produced at the positive electrode and the metal is redeposited by reduction at the negative electrode:

Recharging at the negative electrode: M$^{n+}$+ne$^-$→M

Recharging at the positive electrode: 4OH$^-$→O$_2$+ 2H$_2$O+4e$^-$

The air electrode is not designed to be used in the reverse direction, and tends to be mechanically destroyed by the hydraulic pressure that is formed during the production of oxygen. This hydraulic pressure generally causes the bonds to break between the carbon grains which constitute the air electrode. This degradation reduces the life of the battery.

In addition, the catalyst added to the air electrode to improve the energy efficiency of the oxygen reduction reaction degrades at the potential required for the reverse oxidation reaction when charging the battery. The corrosion of carbon in the presence of oxygen by oxidation of the carbon is also accelerated at higher potentials.

To remedy these stability problems, particularly during charging, it has been proposed to use a second positive electrode which is only used for charging the battery. A switch then allows connecting a positive terminal of a circuit to the second electrode during charging, and connecting this positive terminal to the air electrode during discharging of the battery. Application WO 2014/083267 describes an example of a battery using such a system to preserve the air electrode from degradation in the charging phase.

This second positive electrode, used during charging of the battery, is typically composed of a metal grid of nickel or a metal alloy. This electrode may also be made of a material capable of storing a limited amount of electrical energy without oxygen evolution. An example of such a positive electrode is an electrode composed of nickel oxide hydroxide, NiO(OH).

Despite a significant improvement in the life of a metal-air battery by providing a second positive electrode used for the oxygen evolution during charging, the electrical performance of the metal-air battery degrades over time.

In addition, the power of the air electrode is limited by the rate of diffusion of air within the porous structure of the electrode. Despite a high energy density which allows a metal-air battery to supply over a long period the electrical energy stored in its cell or cells, the physical constraints related to this rate of diffusion in air electrodes limit the electric power these batteries are able to provide.

Because of this constraint, applications requiring more power than the power that the area electrode is capable of providing rely on complex systems integrating a metal-air battery and separate additional sources. For example, a metal-air battery used for low power draws can be used in conjunction with a supercapacitor or capacitor able to provide greater electric power for short periods of time. However, these systems complicate the use of metal-air batteries.

Document WO2013/110097 discloses cells for metal-air batteries which make use of a first reversible metal electrode, an air electrode, and a second reversible electrode acting as a cathode in the discharging phase and as an anode in the charging phase. This document describes a two-stage discharge in which only the second positive electrode is used and only at the beginning of discharge, and a second stage where the air electrode is used when the voltage across the battery has dropped sufficiently to reach a threshold value. In that document, the two discharging phases are consecutive and the voltage is controlled to switch from the first stage to the second stage. However, in batteries, the voltage measurement is not a good indicator of battery power and is only used to determine the charge state. In fact, in a battery (unlike in a resistor), the voltage does not vary much as the power varies and does so non-linearly, but it depends on other parameters such as the thermodynamic potential of the electrodes, the mass transport of ions in the electrolyte, charge accumulation phenomena at the interfaces and the activation barriers related to oxidation-reduction reactions or the charge state of the electrode. As a result, the voltage measurement conducted on a battery in document WO2013/110097 does not enable satisfactory management of the electric power passing through the battery.

Document US2011/0250512 describes a metal-air cell comprising a negative electrode, a positive air electrode, an oxygen evolution electrode, and a high efficiency electrode enabling the implementation of standard charging and discharging phases via the air electrode, and, in one embodiment, with better efficiency via the high efficiency electrode.

A method is therefore sought for increasing the electrical performance of a metal-air battery, particularly by improving their ability to provide electric power and better manage the electric power passing through the battery during charging and discharging.

SUMMARY

In response to the problems described above, the present invention proposes a method for managing the electric power passing through a cell of a metal-air battery, the cell comprising:
  a negative electrode electrically connected to a negative terminal of the battery;
  a first positive electrode forming an air electrode of the cell;
  a second positive electrode forming a power electrode of the cell;
  a switching means for electrically connecting an electrode among the first positive electrode and the second positive electrode to a positive terminal of the battery.
The method further comprises:
  maintaining the switching means in a configuration connecting the positive terminal to the first positive electrode when an electric power to pass through the battery corresponds to a first power range;
  maintaining the switching means in a configuration connecting the positive terminal to the second positive electrode when an electric power to pass through the battery corresponds to a second power range, the second power range being associated with higher electric powers than the electric powers of the first range.

The invention makes it possible to optimize the electric power passing through a metal-air battery cell by making the best possible use of the electrical capacities (expressed in mAh/cm$^2$) of the various positive electrodes.

Indeed, the air electrode (first positive electrode) has a higher energy density than that of the second positive electrode but cannot provide significant electric power due in particular to the rate of diffusion of air within its structure. The air electrode is therefore effective in situations requiring little power during discharging (or situations supplying little power to the battery during charging) but can deliver or store electric power for a longer period than the second positive electrode.

As for the second positive electrode, it is not limited by the rate of diffusion of air and can therefore be used when greater electric power is required from the battery during discharging, and when a greater supply of power is occasionally available during charging.

Such management of the power passing through a metal-air battery cell may be used to charge the battery more quickly by giving preference to high-power charging on the second positive electrode, while the first positive electrode may for example be used during slow charging at low electric power. However, it may be preferable to avoid charging the battery using the first positive electrode to avoid oxygen evolution likely to damage its porous structure.

In addition, during discharge, the invention can advantageously use the differentiated electrical capabilities of the two positive electrodes so that there is no longer the need for a complementary electrical system (such as access to supercapacitors or capacitors) for power demands that exceed the power the air electrode is able to store. The metal-air battery can thus meet these different power requirements by itself, which makes it possible to design less complex systems that are simpler to build and to control during charging and discharging.

According to one embodiment, the method may further comprise:
  obtaining the value of a parameter representative of an electric power to pass through the battery;
  comparing the estimated value to a threshold value representative of a transition between the first power range and the second power range; and
  when the estimated value is above the threshold value:
    maintaining the switching means in a configuration connecting the positive terminal to the second positive electrode in order to meet the power criteria of the second power range;
  when the estimated value is below the threshold value:
    maintaining the switching means in a configuration connecting the positive terminal to the first positive electrode in order to meet the power criteria of the first power range.

The parameter representative of an electric power to pass through the battery may preferably be an electric current passing through the battery.

According to one embodiment, the parameter representative of the electric power to pass through the battery may be an electric current measured on the negative electrode.

In particular, when the cell is discharging and when the amplitude of the measured current is above the threshold value, the method may comprise:
  maintaining the switching means in a position connecting the positive terminal to the second positive electrode;
when the amplitude of the measured current is below the threshold value:
  maintaining the switching means in a position connecting the positive terminal to the first positive electrode.

An increasing current measured on the negative electrode is the sign of a rise in the electric power received or to be supplied by the battery. By defining a threshold value for this measured current, it is possible to adapt the power range of the battery to its external environment.

According to one embodiment, with the cell comprising an oxygen-evolution third positive electrode, the method may further comprise, when the cell is charging and when the amplitude of the measured current is above the threshold value:

maintaining the switching means in a position connecting the positive terminal to the second positive electrode;
when the amplitude of the measured current is below the threshold value:
maintaining the switching means in a position connecting the positive terminal to the third positive electrode.

This embodiment which makes use of a third positive electrode is particularly preferred when the method according to the invention is carried out in a charging phase requiring high power.

By using a third positive electrode in the battery, it is possible to protect the first positive electrode (air electrode) from the negative effects of oxygen evolution during charging, but the second positive electrode as well, as it can also be progressively degraded by the release of oxygen. Thus, the third positive electrode can be used when slow charging at low power is taking place, and the second positive electrode can be used when the battery is receiving higher electric power, which also allows charging the battery more quickly.

In particular, the threshold value can be between 20 mA per $cm^2$ of negative electrode and 40 mA per $cm^2$ of negative electrode.

This threshold value can in particular be adapted for a metal-air battery with a zinc negative electrode and a second positive electrode made of nickel oxide hydroxide. Other values can be estimated when other materials are used for the various component electrodes of the battery.

According to one embodiment, the method may further comprise:
selecting the configuration of the switching means based on predictions of the power that will pass through the battery.

If the operation of an electric circuit to which the battery is connected will have power requirements that can be predicted in advance, or if the electric circuit is able to provide increased or reduced power at predictable times and for predictable durations, it is possible to schedule the switchover between the positive electrodes (air electrode and second positive electrode) to optimize efficiency during the charging and discharging of the battery while taking these power peaks into account. For example, when the electric circuit includes a photovoltaic panel, sunlight forecasts allow estimating in advance the power variations that the battery could undergo. When the battery is used for example in an electric vehicle, particularly an autonomous electric vehicle, it is possible to predict in advance the energy that will be required to move the vehicle, and therefore the electric power involved, on the basis of the traveled terrain and the traffic for example.

According to one embodiment, the method may further comprise, at the beginning of charging the battery:
maintaining the switching means in a position connecting the positive terminal to the second positive electrode.

At the beginning of charging, it is preferable to avoid oxygen evolution that is too early or too significant. By preferably connecting the second positive electrode during charging rather than the air electrode, this avoids oxygen evolution which could contribute to prematurely destroying the air electrode and which could slow down the charging of the battery by interfering with the flow of ions in the electrolyte and in particular by slowing down the dynamics of the deposition of metal ions on the negative electrode.

The invention also relates to a cell for a metal-air battery, comprising:
a negative electrode adapted to be electrically connected to a negative terminal of the battery;
a first positive electrode forming an air electrode of the cell;
a second positive electrode forming a power electrode of the cell;
a switching means for electrically connecting an electrode among the first positive electrode and the second positive electrode to a positive terminal of the battery.

According to one particular embodiment, the cell is characterized in that the second positive electrode is positioned between the negative electrode and the first positive electrode.

The switching means may further be configured for:
connecting the positive terminal to the first positive electrode when an electric power to pass through the battery corresponds to a first power range;
connecting the positive terminal to the second positive electrode when an electric power to pass through the battery corresponds to a second power range, the second power range being associated with higher electric powers than the electric powers of the first range.

Such a cell is particularly suitable for implementing the power management method described above. It may in particular be advantageous to provide, as a second positive electrode, an electrode comprising a metal oxide such as nickel oxide hydroxide. These materials are generally good candidates for forming power electrodes, whose energy density is lower than that of the air electrode but which can deliver greater electric power than an air electrode.

In particular, the cell may comprise a device for measuring a parameter representative of an electric power to pass through the battery.

Such a device may be provided, for example, to measure a current in the battery or a voltage across a resistor connected in series with said battery, in order to determine the electric power demands and inputs in the battery and in an electric circuit connected to the battery.

In particular, the measuring device may be chosen among: a Hall effect sensor for measuring a current, a resistor, a shunt.

According to one embodiment, the switching means may be chosen among: a mechanical relay, an electromechanical relay.

According to one embodiment, the cell may further comprise:
a third positive electrode forming an oxygen-evolution electrode of the cell.

By providing a third positive electrode, the invention can be used to increase the life of the battery by reducing wear on the second positive electrode by using it less often and alternating it with the third positive electrode. The third positive electrode may in particular be selected when there is significant oxygen evolution in the battery during charging, to preserve the second positive electrode from the possible detrimental effects related to such oxygen evolution.

According to a preferred embodiment, the third positive electrode is also positioned between the negative electrode and the first positive electrode.

The invention also relates to a cell for a metal-air battery comprising two sets of positive electrodes as described above, arranged symmetrically one on each side of the negative electrode. In this embodiment, the invention relates to a symmetrical cell for a metal-air battery comprising two sets of positive electrodes as described above, sharing a negative electrode between the two positive sets.

According to one embodiment, the cell may be arranged in a device chosen among: a photovoltaic panel, an electric vehicle.

Such devices have significant variations in the electric power consumed or produced over time. Photovoltaic panels produce more or less power depending on the amount of sunlight and electric vehicles consume more or less power depending on their conditions of use and on acceleration in particular. Electric vehicles may also occasionally offer attractive charging opportunities, particularly during braking phases when transient electric power can be more efficiently recovered and stored due to the second positive electrode (power electrode) in a cell according to the invention.

The invention also relates to a metal-air battery comprising at least one cell as set forth and described above.

BRIEF DESCRIPTION OF THE DRAWINGS

The method which is the object of the invention will be better understood by reading the following description of some exemplary embodiments presented for illustrative purposes and in no way limiting, and by observing the following drawings in which.

For clarity, the dimensions of the various elements shown in these figures are not necessarily in proportion to their actual dimensions. In the figures, identical references correspond to identical elements.

DETAILED DESCRIPTION

The present invention provides a method for managing the electric power passing through a cell of a metal-air battery, that optimizes the operation of the battery during both charging and discharging. The method and the cell enabling implementation of the method reduce the need for supercapacitors or capacitors to supplement a metal-air battery in order to satisfy intermittent power draws. The invention also makes it possible to optimize the charging time by charging the battery via a positive electrode capable of storing and delivering higher power than the air electrode. This power electrode makes better use of recharging opportunities when the battery is receiving high electric power over short periods of time. For slow charging at lower power, it is possible to switch to charging on the air electrode or another electrode.

Figure 1:
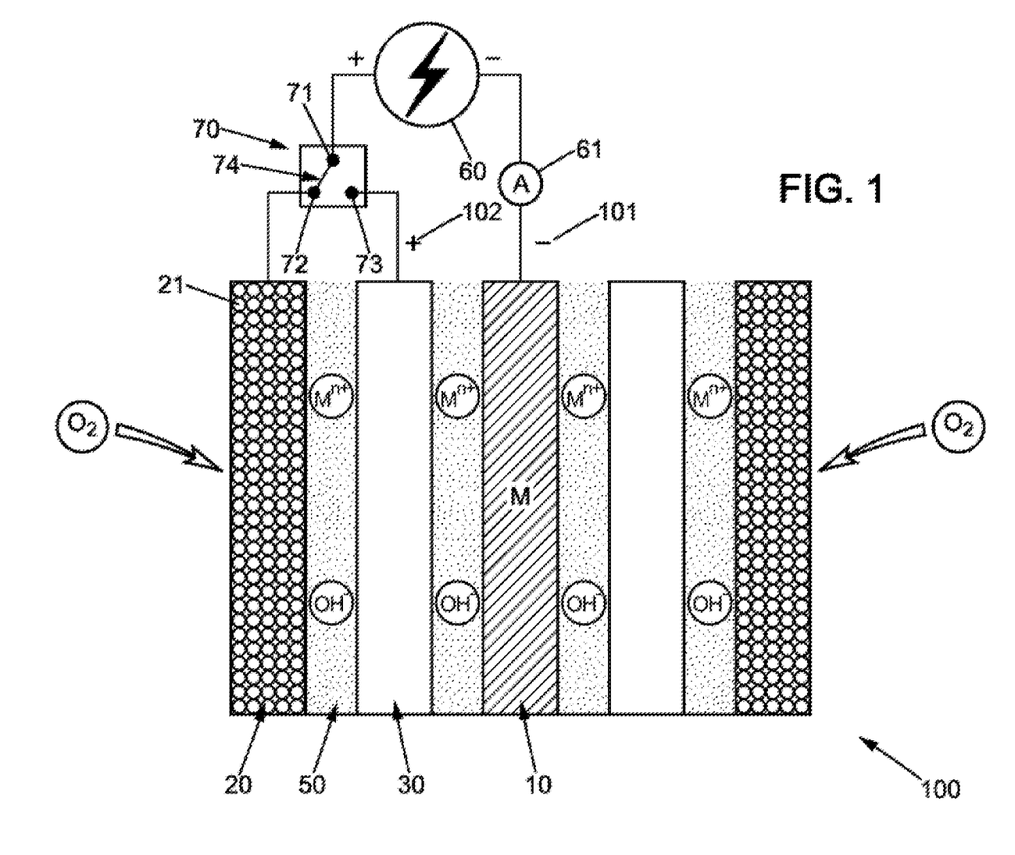
FIG. 1 is a schematic representation of a metal-air battery cell comprising a switch managing the electric power passing through the battery according to the invention.

FIG. 1 schematically represents a cell 100 of a metal-air battery comprising a negative electrode 10, an electrolyte 50 of strongly basic pH (typically a pH of at least 14), a first positive electrode 20 forming an air electrode of the battery, and a second positive electrode 30 forming a power electrode of the battery. The air electrode has a porous structure and is composed of carbon powder 21. During discharging, the air reacts in the structure of the air electrode with the electrolyte to produce hydroxyl ions and the metal M of the negative electrode is converted into ions that circulate in the electrolyte, as explained above.

The power from the operation of the air electrode is constrained by the rate of diffusion of air in the porous structure of the electrode, which prevents this electrode from delivering significant electric power. The second positive electrode 30 of a metal-air battery is not limited by this phenomenon and can theoretically deliver higher electric power than the air electrode.

The use of the second positive electrode 30 in a metal-air battery is generally limited to the charging of the battery, in order to prevent oxygen evolution from occurring in the structure of the first positive electrode 20.

The inventors have noted that the second positive electrode can also advantageously be used during discharging to provide electric power greater than the power accessible with the air electrode alone.

In particular, the second positive electrode may typically be of a metal such as nickel, silver, or stainless steel.

It has been observed that the use of metal oxides in the second positive electrode could be of interest for further increasing the electrical performance of a metal-air battery. This second positive electrode 30, generally made of a metal such as nickel, is sometimes composed of an oxide such as, for example, nickel oxide hydroxide (NiOOH) using the Ni(II)/Ni(III) pair.

It has been found that the use of nickel oxide hydroxide (NiOOH) using the Ni(II)/Ni(III) pair in the material of the second positive electrode 30 has advantages from an electrical standpoint. Indeed, the nickel oxide hydroxide provides more power than the air electrode. The use of a second positive electrode 30 of nickel oxide hydroxide offers the possibility of combining the advantages of the discharging cycle duration of metal-air batteries (accessible due to the high energy density of air electrodes) with the power performances of metal-nickel batteries. A metal-air battery cell using a metal oxide such as nickel oxide hydroxide as the second positive electrode forms a "metal-nickel-air" hybrid cell. In the discharging phase, the following reaction is observed on the second positive electrode 30:

$$NiO(OH) + H_2O + e^- \rightarrow Ni(OH)_2 + OH^-$$ (reaction a)

Such a battery can allow more refined management of the power and electrical energy passing through the battery. When a standard demand for power reaches the battery in the discharging phase, the first positive electrode 20 can be connected to the positive terminal. For larger power draws, it is possible to connect the second positive electrode of nickel oxide hydroxide.

The choice of component material of the second positive electrode is not limited to the materials listed above. In order to fulfill this power electrode function, it is possible to provide any alloy or material able to provide greater electric power than the air electrode. For example, materials such as silver oxide or manganese oxide may be used in addition to nickel oxide hydroxide. The second positive electrode is typically made of a material having a more positive oxidation-reduction potential than that of the material constituting the negative electrode (typically zinc, iron, or lithium).

FIG. 1 shows an electric circuit 60 connected to a negative terminal 101 of the battery comprising the cell 100 (the negative electrode 10) and a positive terminal 102 of the battery comprising the cell 100. The positive terminal of the circuit 60 is connected to a switching means 70 comprising three connection points 71, 72, 73 and a connecting means 74 for connecting two of these points. The switching means 70 may in particular be a switch, a mechanical relay or an electromechanical relay for example. The switching means may be controlled by a system managing the power draws from the battery, such as a BMS (for "battery management system") adapted to implement the method of the present invention.

A measuring device 61, preferably connected to the negative electrode 10, makes it possible to measure an electrical parameter of the cell 100 giving an indication of the power received or to be supplied by the battery. This current measuring device may, for example, be an ammeter or a Hall effect sensor allowing direct measurement of the current or a resistor or shunt measuring the voltage across a resistor, this voltage across the resistor being (unlike a battery) directly proportional to the current.

The invention makes it possible to distinguish two different power ranges, during charging as well as discharging, on the basis of the electric power received or to be supplied by the battery. In a first power range, the switching means 70 connects the positive terminal 102 of the battery to the first positive electrode 20. In a second power range corresponding to higher powers than those of the first power range, the switching means 70 connects the positive terminal 102 to the second positive electrode.

Although the measuring device 61 shown in FIG. 1 is an ammeter measuring an electric current passing through the battery, other means of monitoring the electric power received or to be supplied by the battery may be envisaged. The measuring device may be any device measuring a parameter representative of an electric power to pass through the battery, such as a voltage across a resistor connected to the battery or a current for example. A voltmeter measuring the current may for example be placed upstream of the switching means on the positive terminal of the battery.

Figure 2:
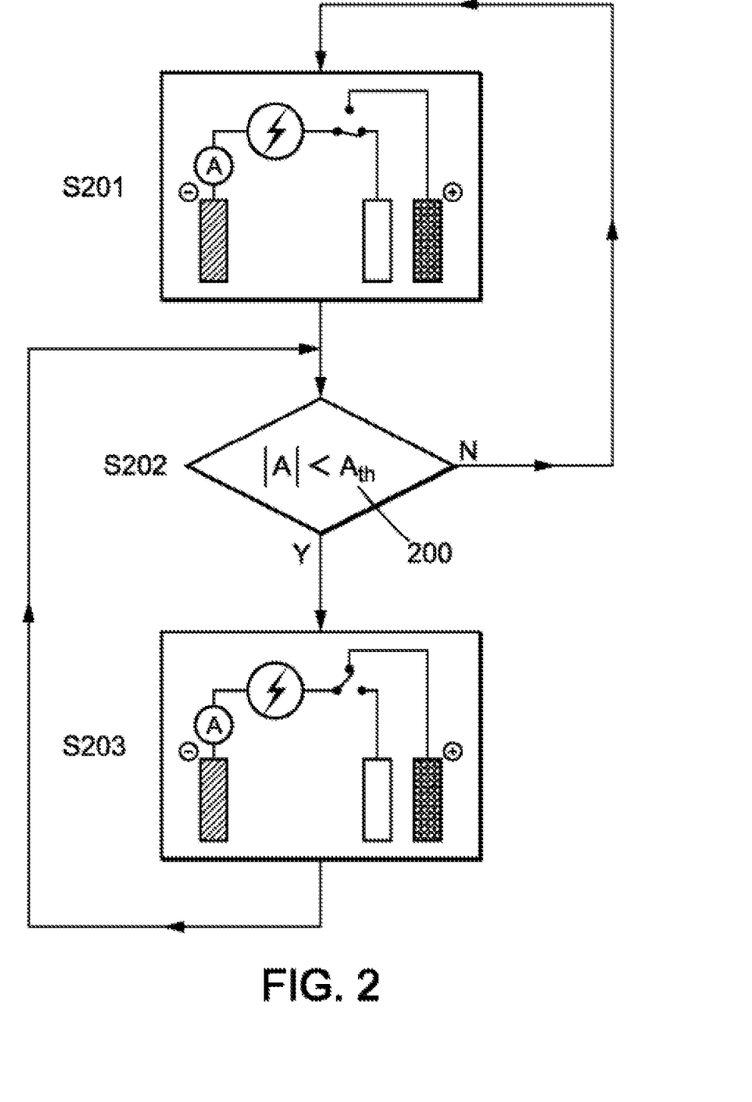
FIG. 2 is a flowchart representing a method for charging a metal-air battery according to the invention.
Figure 3:
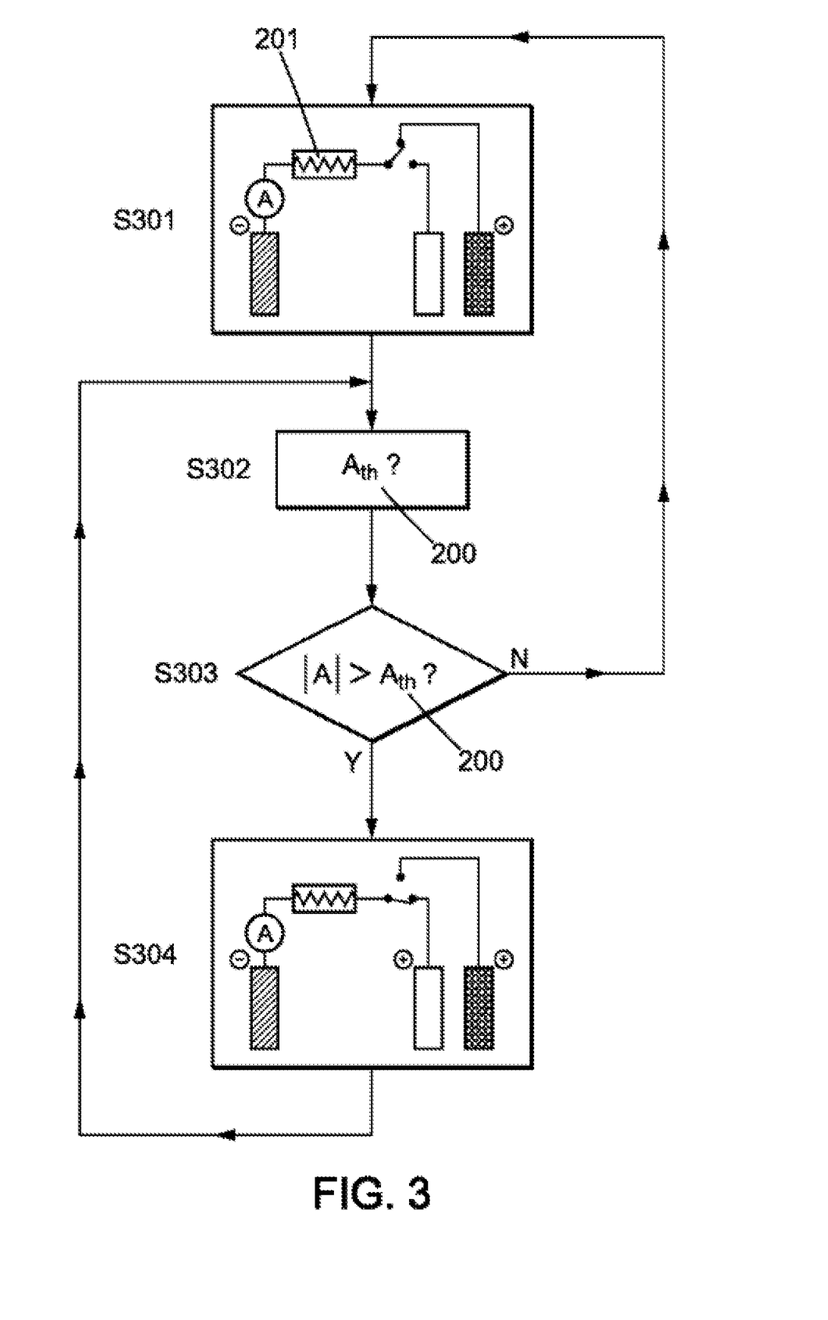
FIG. 3 is a flowchart representing a method for discharging a metal-air battery according to the invention.

FIGS. 2 and 3 schematically illustrate two flowcharts representative of a charging and discharging cycle of a metal-air battery according to the method of the invention.

During a first step S201 during charging, the positive terminal of an electric circuit 60 is connected to the second positive electrode 30 of the battery. It is preferable to start charging by connecting the second positive electrode 30 even if the power demand does not subsequently justify this, because oxygen evolution at the first positive electrode 20 over a prolonged period could damage it. On the other hand, an excessive release of oxygen bubbles into the electrolyte from the air electrode could not only unduly damage the air electrode, it could also contribute to interfering with the deposition of metal ions on the negative electrode during the reduction of the salt into metal. The higher the charging current, the larger the oxygen bubbles generated, which increases the inhomogeneity of the metal deposition on the negative electrode. Thus, an appropriate management of the charging phases which gives preference to using the second positive electrode 30 to promote fast charging which better stores the high powers received helps reduce the formation of these bubbles and their destructive effect on the battery.

Throughout charging and during step S202 in FIG. 2, the parameter representative of a power to pass through the battery is measured and compared with a threshold value Ath, 200, representative of a transition between the first power range and the second power range. For a second positive electrode 30 of nickel oxide hydroxide coupled with a negative electrode 10 of zinc, and when the measured parameter is an electric current to pass through the battery, the threshold value may be for example between 20 mA/cm$^2$ and 40 mA/cm$^2$ (this current being expressed in mA per square centimeters of negative electrode), and advantageously equal to 30 mA/cm$^2$.

When the amplitude of the measured current is less than the threshold value 200, this is representative of low power being input. It is then appropriate to provide slow charging on the first positive electrode 20 and to connect the air electrode to the positive terminal 102 of the battery, the second positive electrode 30 being electrically inactive.

When the amplitude of the measured current becomes greater than the threshold value, this is representative of higher power being input and it then becomes appropriate to take advantage of this to perform faster charging without damaging the air electrode, by connecting the second positive electrode 30 to the positive terminal 102 of the battery (represented in FIG. 2 by step S203).

The charging of the battery represented by the flowchart of FIG. 3 proceeds in the same manner. In contrast to the flowchart of FIG. 2, the initial discharging phase proposes connecting the first positive electrode 20 to the positive terminal 102 of the battery in step S301. The threshold value 200 may also be reevaluated during discharging as indicated by step S302, in particular to take into account the fact that the second positive electrode does not supply the same power throughout the discharging cycle of the battery, the maximum available power generally progressively decreasing over time. The threshold value 200 and its evolution during a discharging cycle can be estimated empirically or on the basis of a first charging/discharging cycle for a metal-air battery during which the electric powers available during discharging are measured continuously over time.

In step S303, the measured current is compared with the threshold value 200. If this current is greater than the threshold value 200, the power electrode is connected and the air electrode disconnected as indicated in step S304.

Different modes of operation for managing the electric power passing through or to pass through a metal-air battery can be envisaged.

It is possible for a control unit for the switching means 70 to be programmed to connect the first or second positive electrodes sequentially to the positive terminal 102 of the battery, based on a preprogrammed operating cycle. Such a preprogrammed cycle can be determined in advance, based on predictions of the battery use.

Such an operation can be combined with an operation that takes into account the power demands and power inputs in the battery (determined during operation by means of the measuring device 61 for example).

The method for managing the electrical energy of the invention may in particular be implemented in systems subject to power fluctuations, such as photovoltaic panels or electric vehicles for example.

Photovoltaic panels produce more or less electric current and higher or lower electric power depending on the level of sunlight. It is possible to predict these fluctuations based on weather forecasts, or to adjust to them by connecting the second positive electrode 30 when the power supplied to the metal-air battery is high (strong sunlight) and switching to the positive electrode when there is less sunlight.

In an electric vehicle, braking phases can represent opportunities for fast charging on the second positive electrode 30. Other charging phases (weak braking, or charging on the grid) can take place on the air electrode for example.

It has been found that the second positive electrode 30 also undergoes some degradation during charging cycles, due to the production of oxygen. However, it has also been noted that the oxygen evolution on this second positive electrode 30 is less significant than what is observed for the same charging on the air electrode.

The electrical capacity (expressed in mAh/cm$^2$) of the second positive electrode 30 turns out to be lower than that of the negative electrode 10. This is observed in particular in the case of a second positive electrode 30 of nickel oxide hydroxide and a negative electrode 10 of zinc. One consequence of this difference in capacity is that recharging the cell requires two oxidation reactions at the second positive electrode 30. In a first oxidation reaction, the nickel in oxidation state (II) is converted into nickel in oxidation state (III) according to the reaction:

$\qquad$ (reaction b)

When the nickel has changed its oxidation state, a second oxidation reaction takes over to continue charging the negative electrode 10 (this negative electrode typically being of zinc, iron, or lithium), until the battery is completely charged. This second reaction converts the hydroxyl ions of the electrolyte 50 into oxygen according to the conventional oxygen evolution reaction:

In order to best restrict the negative effects related to oxygen evolution, it may be advantageous to provide a third positive electrode in a cell 100 of a metal-air battery, this electrode being connected during charging when the second oxidation reaction with oxygen production occurs.

Figure 4:
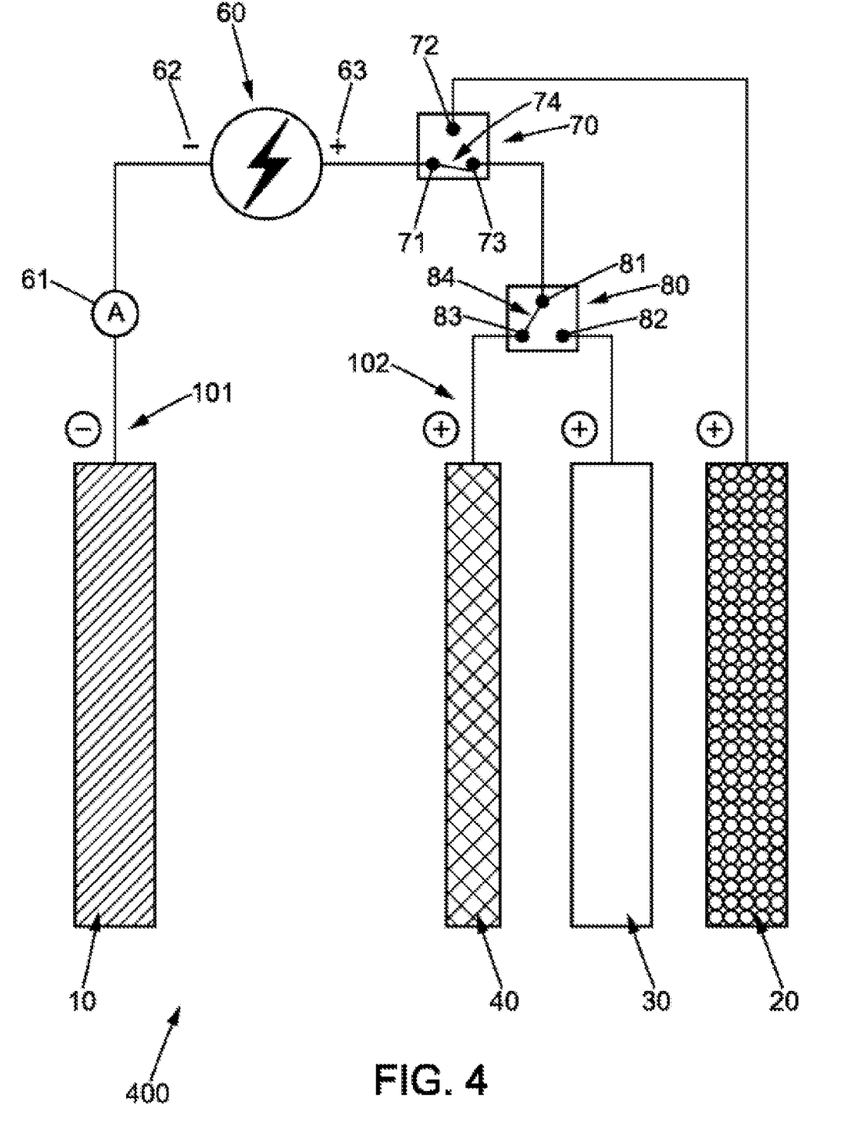
FIG. 4 is a schematic representation of a metal-air battery according to the invention, further comprising a third positive electrode to reduce the negative effects of oxygen evolution in the battery during charging.

FIG. 4 schematically represents an example of a metal-air battery 400 comprising a third positive electrode 40 in addition to the negative electrode 10, the first positive electrode 20, and the second positive electrode 30. The electric circuit 60 has a negative terminal 62 connected to the negative terminal 101 of the battery 400. The electric circuit 60 also comprises a positive terminal 63 connected to a positive terminal 102 of the battery 400.

The battery 400 is composed of a single cell in FIG. 4, but it could also comprise a plurality of cells connected in series or in parallel. The battery 400 comprises a first switching means 70 as described above, and a second switching means 80 to enable connecting the positive terminal 63 of the circuit 60 to the second positive electrode 30 or third positive electrode 40. The second switching means thus comprises three connection points 81, 82, 83 and a means for connecting connection point 81 to one of connection points 82 or 83.

According to this improvement of the invention, the charging phase can be separated into two phases: a first phase without oxygen evolution during which it is preferred to connect the second positive electrode 30 to the positive terminal 63 of the circuit 60, and a second phase during which it is preferred to connect the third positive electrode 40 to the positive terminal 63 of the circuit 60.

However, this charging mode is complementary to the charging/discharging logic described above, which consists of favoring the use of the second positive electrode 30 during charging or discharging when the power received or requested from the battery 400 is higher than the power the air electrode can handle. It is possible in particular to favor the use of the second positive electrode 30 for charging the battery when the electric power received is above a threshold, while the first positive electrode 20 or the third positive electrode 40 can be used when the electric power received is below it. The third positive electrode 40 would be preferable to the first positive electrode 20 during charging in order to avoid damaging the porous structure of the air electrode.

The switching means 70, 80 may be controlled on the basis of the measurement of a current flowing through the battery or of a voltage across a resistor connected to the battery, by one or more measuring devices. When a third positive electrode 40 is present in the battery 400, it is possible not to use the air electrode at all when charging. The third positive electrode 40 is then an oxygen-evolution electrode, preferably of a pure metal such as nickel, titanium, or steel.

In addition, when the metal-air battery comprises a negative electrode 10 of zinc, a second positive electrode 30 of nickel oxide hydroxide, and a third positive electrode 40 of nickel, it is possible to provide a voltage threshold for connecting the second positive electrode 30 to the positive terminal 102 of the battery. This voltage threshold may for example correspond to a voltage amplitude of 1.9V between the terminals 101, 102. For voltage amplitudes greater than 1.9V, the third positive electrode 40 is connected and the second positive electrode 30 is disconnected. For voltage amplitudes below 1.9 V, the third positive electrode 40 is disconnected and the second positive electrode 30 is connected. A second voltage threshold allows determining, preferably during discharging, whether to connect the air electrode or the second or third positive electrode. This second voltage threshold may for example be 1.2V. For voltage amplitudes above 1.2V, the second positive electrode 30 is connected. For voltage amplitudes below 1.2V, the first positive electrode 20 is connected.

Figure 5:
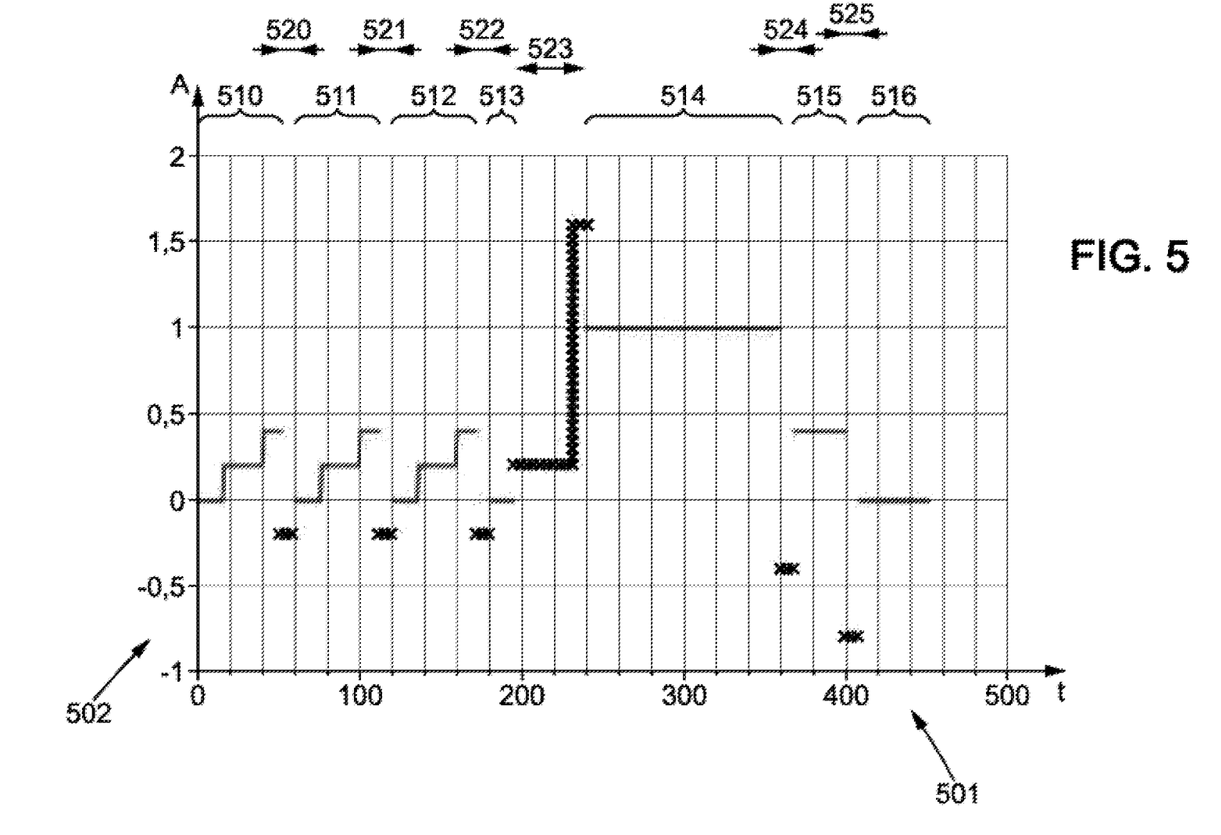
FIG. 5 is a graph showing the current passing through the battery measured at the negative electrode, as a function of time, for a use of the battery in an electric vehicle.

FIG. 5 schematically illustrates the profile of the electric current flowing through a metal-air battery as presented above when such a battery is installed in an electric vehicle. Over time, the current does not follow well-defined charging and discharging cycles: the battery is in turn charged and discharged according to the vagaries of driving.

The horizontal axis 501 of FIG. 5 represents the time in seconds, while the vertical axis 502 of FIG. 5 represents the current measured on the negative electrode 10 in mA.

Phases 520-525, represented by Xs, correspond to a use of the second positive electrode.

Phase 523 corresponds to a sudden acceleration (for example overtaking) which requires significant electric power to the battery within a short time.

In FIG. 5, the negative currents correspond to charging phases (520-522, 524-525) and the positive currents correspond to discharging phases of the battery.

Phases 510-516 correspond to a use of the air electrode (first positive electrode 20). These phases include normal accelerations with low power contributions (50-512), and phases during which the demand for power from the battery is low compared to the power of phases 520-525.

The invention also relates to a computer program product comprising a series of instructions stored on a storage medium for execution by a computer or a dedicated device, the program being configured to execute the method set forth above.

Figure 6:
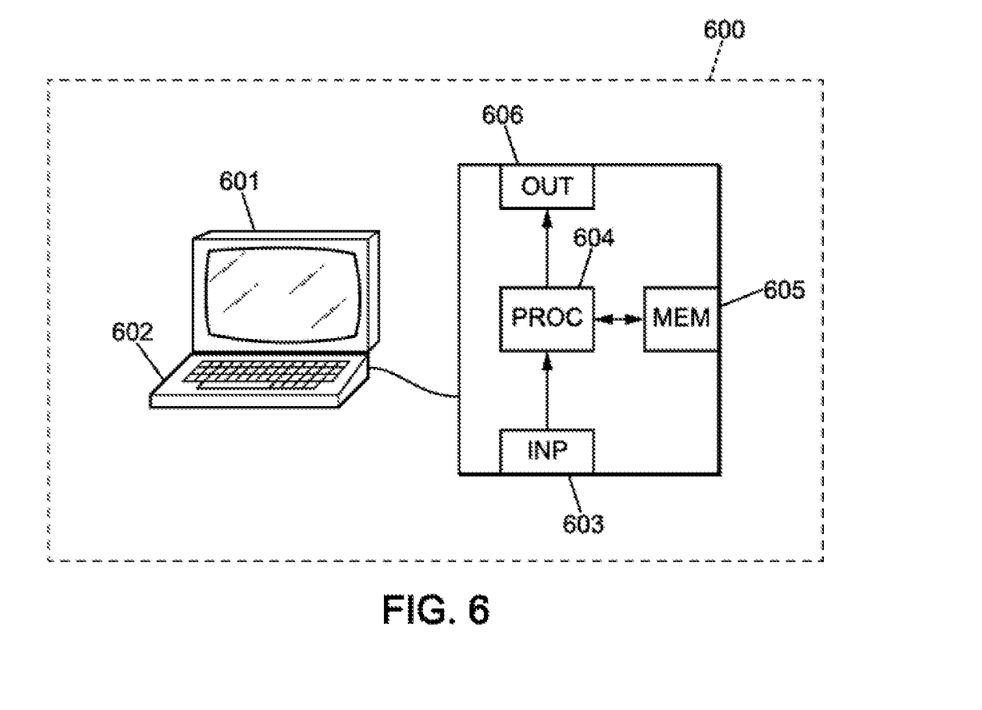
FIG. 6 is a schematic representation of a computer system that can be used to implement the method of the invention.

FIG. 6 shows an example of a computer system which allows running a computer program product comprising instructions implementing the method of the present invention.

In this embodiment, the device comprises a computer 600, comprising a memory 605 for storing instructions for implementing the method, the received measurement data, and temporary data for carrying out the various steps of the method as described above.

The computer further comprises a circuit 604. This circuit may be, for example:
- a processor capable of interpreting instructions in the form of a computer program, or
- a circuit board in which the steps of the method of the invention are defined in the silicon, or
- a programmable electronic chip such as an FPGA (for "Field Programmable Gate Array").

This computer has an input interface 603 for receiving measurement data, and an output interface 606 for providing commands controlling the evacuation device 607. Finally, the computer may comprise a screen 601 and a keyboard 602 to enable easy interaction with a user. Of course, the keyboard is optional, particularly in the context of a computer in the form of a touchscreen tablet for example.

The invention finds applications in rechargeable metal-air batteries, and allows increasing their service life and their electrical performance. The improved management of the electric power passing through a metal-air battery during charging and discharging according to the invention makes them usable in many systems, for example such as photovoltaic devices subject to variations in current related to sunlight, or electric vehicles that consume and store variable electric power related to the use being made of the vehicle and to the braking or acceleration conditions.

The invention claimed is:

1. A method for managing the electric power passing through a cell of a metal-air battery, the cell comprising:
   a negative electrode electrically connected to a negative terminal of the battery;
   a first positive electrode forming an air electrode of the cell;
   a second positive electrode forming a power electrode of the cell;
   a switching means for electrically connecting an electrode among the first positive electrode and the second positive electrode to a positive terminal of the battery;
the method comprising:
   maintaining the switching means in a configuration connecting the positive terminal to the first positive electrode when an electric power to pass through the battery corresponds to a first power range;
   maintaining the switching means in a configuration connecting the positive terminal to the second positive electrode when an electric power to pass through the battery corresponds to a second power range, the second power range being associated with higher electric powers than the electric powers of the first range.

2. The method according to claim 1, further comprising:
   obtaining the value of a parameter representative of an electric power to pass through the battery;
   comparing the estimated value to a threshold value representative of a transition between the first power range and the second power range; and
when the estimated value is above the threshold value:
   maintaining the switching means in a configuration connecting the positive terminal to the second positive electrode in order to meet the power criteria of the second power range;
when the estimated value is below the threshold value:
   maintaining the switching means in a configuration connecting the positive terminal to the first positive electrode in order to meet the power criteria of the first power range.

3. The method according to claim 2, wherein the parameter representative of the electric power passing through the battery is an electric current measured on the negative electrode.

4. The method according to claim 3, wherein when the cell is discharging and when the amplitude of the measured current is above the threshold value:
   maintaining the switching means in a position connecting the positive terminal to the second positive electrode;
when the amplitude of the measured current is below the threshold value:
   maintaining the switching means in a position connecting the positive terminal to the first positive electrode.

5. The method according to claim 3, wherein the cell further comprises an oxygen-evolution third positive electrode, the method further comprising, when the cell is charging and when the amplitude of the measured current is above the threshold value:
   maintaining the switching means in a position connecting the positive terminal to the second positive electrode;
when the amplitude of the measured current is below the threshold value:
   maintaining the switching means in a position connecting the positive terminal to the third positive electrode.

6. The method according to claim 4, wherein the threshold value is between 20 mA per $cm^2$ of negative electrode and 40 mA per $cm^2$ of negative electrode.

7. The method according to claim 2, further comprising:
   selecting the configuration of the switching means based on predictions of the power that will pass through the battery.

8. The method according to claim 1, further comprising, at the beginning of charging the battery:
   maintaining the switching means in a position connecting the positive terminal to the second positive electrode.

9. A cell for a metal-air battery, comprising:
   a negative electrode adapted to be electrically connected to a negative terminal of the battery;
   a first positive electrode forming an air electrode of the cell;
   a second positive electrode forming a power electrode of the cell;
   a switching means for electrically connecting an electrode among the first positive electrode and the second positive electrode to a positive terminal of the battery;
wherein the switching means is configured for
   connecting the positive terminal to the first positive electrode when an electric power to pass through the battery corresponds to a first power range;
   connecting the positive terminal to the second positive electrode when an electric power to pass through the battery corresponds to a second power range, the second power range being associated with higher electric powers than the electric powers of the first range.

10. The cell according to claim 9, comprising a device for measuring a parameter representative of an electric power to pass through the battery.

11. The cell according to claim 10, wherein the measuring device is chosen among: a Hall effect sensor for measuring a current, a resistor, a shunt.

12. The cell according to claim 9, wherein the switching means is chosen among: a mechanical relay, an electromechanical relay.

13. The cell according to claim 9, further comprising:
   a third positive electrode forming an oxygen-evolution electrode of the cell.

14. The cell according to claim 9, arranged in a device chosen among: a photovoltaic panel, an electric vehicle.

15. A metal-air battery comprising at least one cell according to claim 9.

* * * * *